(12) United States Patent
Hughes et al.

(10) Patent No.: US 6,358,183 B1
(45) Date of Patent: Mar. 19, 2002

(54) SYSTEM/METHOD FOR LEVER SHIFTING OF A CONTROLLER-ASSISTED, MANUALLY SHIFTED TRANSMISSION

(75) Inventors: Douglas A. Hughes, Wixom; Karen L. Marx, Clawson; Ronald K. Markyvech, Allen Park, all of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/560,040

(22) Filed: Apr. 27, 2000

(51) Int. Cl.$^7$ .............................................. B60K 41/08
(52) U.S. Cl. ........................................ 477/111; 477/124
(58) Field of Search ................................ 477/107, 111, 477/123, 124; 74/335

(56) References Cited

U.S. PATENT DOCUMENTS

| | | | |
|---|---|---|---|
| 4,593,580 A | 6/1986 | Schulze | 74/858 |
| 4,676,115 A | 6/1987 | Morscheck et al. | 74/339 |
| 4,850,236 A | 7/1989 | Braun | 74/377 |
| 5,228,361 A | 7/1993 | Chazot et al. | 74/523 |
| 5,435,212 A | 7/1995 | Menig | 74/745 |
| 5,508,916 A | 4/1996 | Markyvech et al. | 364/424.1 |
| 5,582,558 A | 12/1996 | Palmeri et al. | 477/109 |
| 5,651,292 A | * 7/1997 | Genise | 74/745 |
| 5,679,096 A | * 10/1997 | Stine et al. | 477/111 |
| 5,735,771 A | 4/1998 | Genise | 477/111 |
| 5,894,758 A | * 4/1999 | Walker | 74/335 |
| 5,911,787 A | 6/1999 | Walker | 74/735 |
| 5,950,491 A | 9/1999 | Wadas | 74/735 |
| 6,015,366 A | 1/2000 | Markyvech et al. | 477/109 |
| 6,080,082 A | * 6/2000 | Steeby | 477/111 |
| 6,105,449 A | * 8/2000 | Genise et al. | 74/335 |

FOREIGN PATENT DOCUMENTS

GB 2335010 A 9/1999

* cited by examiner

Primary Examiner—Charles A Marmor
Assistant Examiner—Ha Ho
(74) Attorney, Agent, or Firm—Howard D. Gordon

(57) ABSTRACT

A control system/method for a controller-assisted, manually shifted transmission system (10) senses incomplete jaw clutch engagement (FIGS. 7A and 7B) and causes the engine to dither about zero driveline torque to allow the vehicle operator to fully engage (FIG. 7C) the engaging jaw clutch (200).

23 Claims, 12 Drawing Sheets

SYSTEM/METHOD FOR LEVER SHIFTING OF A CONTROLLER-ASSISTED, MANUALLY SHIFTED TRANSMISSION

FIELD OF THE INVENTION

The present invention relates to controller-assisted shifting of manually shifted transmissions. In particular, the present invention relates to a control system/method for a manually shifted transmission that, in a preferred embodiment, will (i) sense an operator intent to shift and automatically minimize driveline torque, minimizing torque lock and allowing an easy shift to neutral; and (ii) upon sensing a shift to main section neutral, then sense a target gear ratio, cause the engine to rotate at a substantially synchronous speed for engaging the target ratio, and inhibit/prohibit shifting from neutral until substantially synchronous conditions for engaging the target gear ratio are sensed.

More particularly, the present invention relates to a control system/method for a controller-assisted, manually shifted transmission which will automatically control engine torque and/or speed to allow the vehicle operator to fully engage a target ratio.

DESCRIPTION OF THE PRIOR ART

Controller-assisted, manually shifted transmission systems are known in the prior art. Typically, such systems include sensors, actuators and a microprocessor-based controller and will automatically assist manual shifting by sensing an operator intent to shift and cause a reduction in driveline torque and/or by sensing an intended target ratio and causing synchronous conditions for engaging the target ratio. Such controller-assisted systems may be seen by reference to U.S. Pats. No. 4,593,580; 4,850,236; 4,676,115; 5,582,558; 5,755,639; 5,735,771; 6,015,366 and published British patent application GB 2,335,010A, the disclosures of which are incorporated herein by reference.

Transmission systems having controls and/or sensors in the shift knobs are known in the prior art, as may be seen by reference to U.S. Pat. Nos. 4,723,642; 5,228,361 and 5,957,001, the disclosures of which are incorporated herein by reference.

U.S. Pat. No. 5,508,916 illustrates an automated transmission system that will cause dithering about true synchronous during ratio engagement. Allowed, co-pending patent application U.S. Ser. No. 09/330,570 discloses reducing engine output torque upon sensing partial jaw clutch engagement. The disclosures of both of the above are incorporated herein by reference.

The prior art systems were not totally satisfactory, as they required the added cost of providing individual or power synchronizers, they required considerable additional sensors and/or actuators, they required the driver to provide a separate signal of a target ratio, they did not provide a high resistance to shift lever jumpout while still providing high shift quality, they did not minimize shift times, they did not control engine fueling to allow ease of full jaw clutch engagement and/or they did not, with a high degree of reliability, prevent or inhibit non-synchronous shifting.

SUMMARY OF THE INVENTION

In accordance with the present invention, the drawbacks of the prior art are minimized or overcome by the provision of a controller-assisted, manually shifted transmission system which will allow easy disengagement of a currently engaged ratio, will inhibit out-of-synchronous shifts and jumpout, and will provide conditions allowing easy, full engagement of jaw clutches associated with a target gear ratio, all with a minimum of added expense, as compared to previously proposed controller-assisted systems.

In the preferred embodiment, the foregoing is accomplished by providing an assist system for a manually shifted transmission, preferably a splitter-type compound transmission driven by an electronically controlled engine communicating with an industry standard electronic data link, such as an SAE J-1939 or J-1922 data link. The system is provided with sensors and logic to sense an intent to shift and the identity of a target ratio and will command automatic engine fueling to reduce driveline torque when disengaging a currently engaged ratio and to synchronize for engaging a target ratio when the transmission is in neutral.

A plunger actuator assembly responds to command signals to selectively extend and retract a detent plunger, which cooperates with grooves on a shift shaft to selectively inhibit Y-Y shift lever movement to inhibit out-of-synchronous ratio engagements and to provide an in-gear detent to resist shift lever whip-induced jumpout.

During engagement of a target ratio, if only partial jaw clutch engagement is sensed from the shift lever position sensors, for a period of time, the engine will be urged to dither about zero driveline torque, which will cause a dither about true synchronous speed, to minimize a torque lock condition, allowing full clutch engagement.

Accordingly, an object of the present invention is to provide a new and improved controller-assisted, manually shifted transmission system.

This and other objects and advantages of the present invention will become apparent from a reading of the following description of the preferred embodiment taken in connection with the attached drawings.

DESCRIPTION OF THE PREFERRED EMBODIMENT

The term "compound transmission" as used in the following description will designate a change-speed or change-gear transmission having a main transmission section and an auxiliary drive unit, such as an auxiliary transmission section, connected in series whereby the selected gear reduction in the main transmission section may be compounded by further selected gear reduction or reductions in the auxiliary transmission section.

Figure 1:
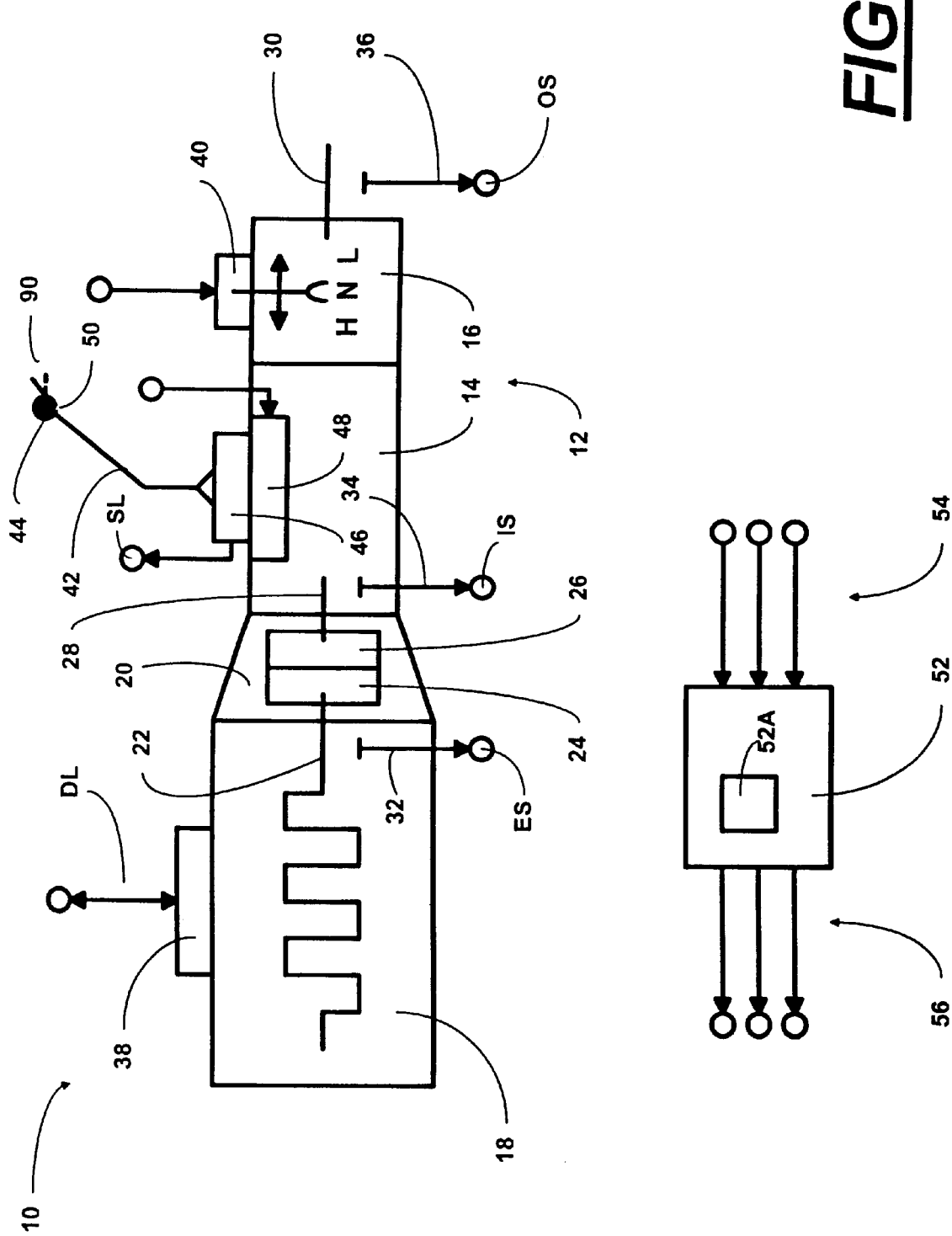
FIG. 1 is a schematic illustration of the controller assisted, manually shifted transmission of the present invention.

The preferred embodiment of a controller-assisted, manually shifted vehicular compound transmission system 10 of the present invention is schematically illustrated in FIG. 1. In system 10, a change-gear transmission 12 comprising a manually shifted main transmission section 14 connected in series with a splitter-type auxiliary transmission 16 is drivingly connected to an internal combustion engine 18, such as a well-known gasoline or diesel engine, by a manually operated master friction clutch 20 or other non-positive coupling. Preferably, auxiliary transmission section 16 is of the three-layer, four-speed combined splitter/range type, as illustrated in U.S. Pat. Nos. 4,754,665 and 5,390,561, the disclosures of which are incorporated herein by reference.

Engine 18 includes a crankshaft 22, which is attached to a driving member 24 of master clutch 20, which is normally frictionally engaged with a driven member 26, which is attached to the input shaft 28 of the transmission. A transmission output shaft 30 extends from the auxiliary transmission section 16 for driving connection to the vehicular drive wheels, as through a drive axle or the like. For purposes of illustration, transmission 12 is illustrated as a (2+1)×(2)×(2) type transmission providing nine or ten selectable forward ratios, as may be seen by reference to the shift pattern schematically illustrated in FIG. 2. Transmissions of this general type are well known in the prior art and are sold by the assignee of this application, EATON CORPORATION, under the trademark "Super-10" and may be seen in greater detail by reference to U.S. Pat. Nos. 6,015,366; 5,974,906 and 5,974,354, the disclosures of which are incorporated herein by reference.

Figure 2:
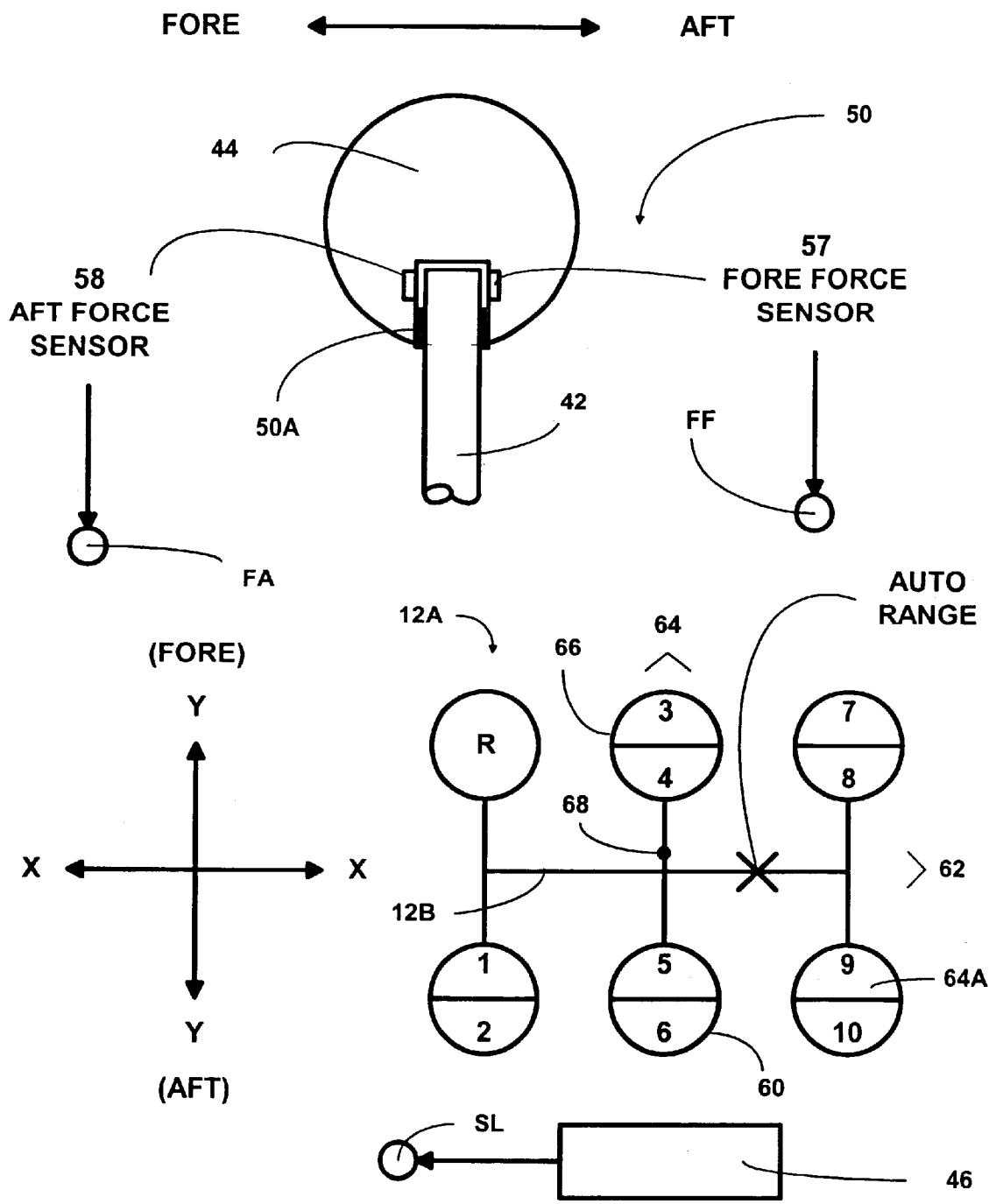
FIG. 2 is a schematic illustration of the position and directional force sensors utilized with the transmission system of FIG. 1.

The shift pattern 12A illustrated in FIG. 2 is of the well-known "H" type, comprising two or more vertical legs (R and 1st/2nd, 3rd/4th and 5th/6th, 7th/8th and 9th/10th) extending in the so-called "Y-Y" (or engaging/disengaging) direction, and a horizontal connecting leg 12B extending in the "X-X" (or selection) direction and located at a centered neutral position in the Y-Y direction.

Controller-assisted transmission system 10 further includes rotational speed sensors 32 for sensing engine rotational speed (ES), 34 for sensing input shaft rotational speed (IS), and 36 for sensing output shaft rotational speed (OS), and providing signals indicative thereof. Engine 18 may be electronically controlled, including an electronic controller 38 communicating over an electronic data link (DL) operating under an industry standard protocol such as SAE J-1922, SAE J-1939, ISO 11898 or the like. A manual clutch pedal (not shown) or an actuator (not shown) may be utilized to selectively engage and disengage normally engaged master clutch 20, as is well known in the prior art.

An auxiliary section actuator 40 is provided to control shifting of the auxiliary section splitter and/or range ratios. Preferably, at least the splitter actuator will be a three-position actuator, allowing the splitter section to be shifted to and maintained in a high splitter ratio, a low splitter ratio or a splitter-neutral position, the structure and advantages of which may be appreciated in greater detail by reference to U.S. Pat. Nos. 5,651,292; 5,974,906 and 5,970,810, the disclosures of which are incorporated herein by reference.

Transmission system 10 includes a manually operated shift lever 42 having a shift knob 44 thereon. Shift knob 44 may be of the type described in aforementioned U.S. Pat. No. 5,957,001. As is well known, shift lever 42 is manually manipulated in a known shift pattern (see FIG. 2) for selective engagement and disengagement of various shift ratios. A position sensor 46 is operable to sense the X-Y position of the shift lever in the shift pattern and to provide a signal (SL) indicative thereof. X-Y position sensors of this type are known in the prior art and examples thereof may be seen by reference to U.S. Pat. Nos. 5,743,143; 5,894,758; 5,950,491 and 5,911,787, the disclosures of which are incorporated herein by reference. System 10 will also include a locking/detent plunger assembly 48, schematically illustrated in FIG. 3, the structure and function of which will be described in greater detail below.

System 10 includes a control unit, preferably a microprocessor-based control unit of the type illustrated in U.S. Pat. Nos. 4,595,986; 4,361,065 and 5,335,566, the disclosures of which are incorporated herein by reference, for receiving input signals 54 and processing same according to predetermined logic rules to issue command output signals 56 are issued to system actuators, such as engine controller 38, auxiliary section shift actuator 40, and inhibit/prohibit detent plunger assembly 48.

System 10 also includes a force threshold detector 50, which will sense forces applied to the shift lever by the operator in either the fore or the aft directions, and will provide signals indicative thereof. Referring to FIG. 2, it may be seen that the shift knob 44 is centered on the shift lever 42, preferably by resiliently deformable means such as a resilient bushing 50A or the like. If the operator applies a force to the shift knob 44 sufficient to deform the resilient material 50A, it will cause either the fore force sensor 57 or the aft force sensor 58 to make contact and provide fore force signal (FF) or an aft force signal (FA). Sensors of this basic type may be seen by reference to U.S. Pat. No. 5,228,361, the disclosure of which is incorporated herein by reference.

Figure 6:
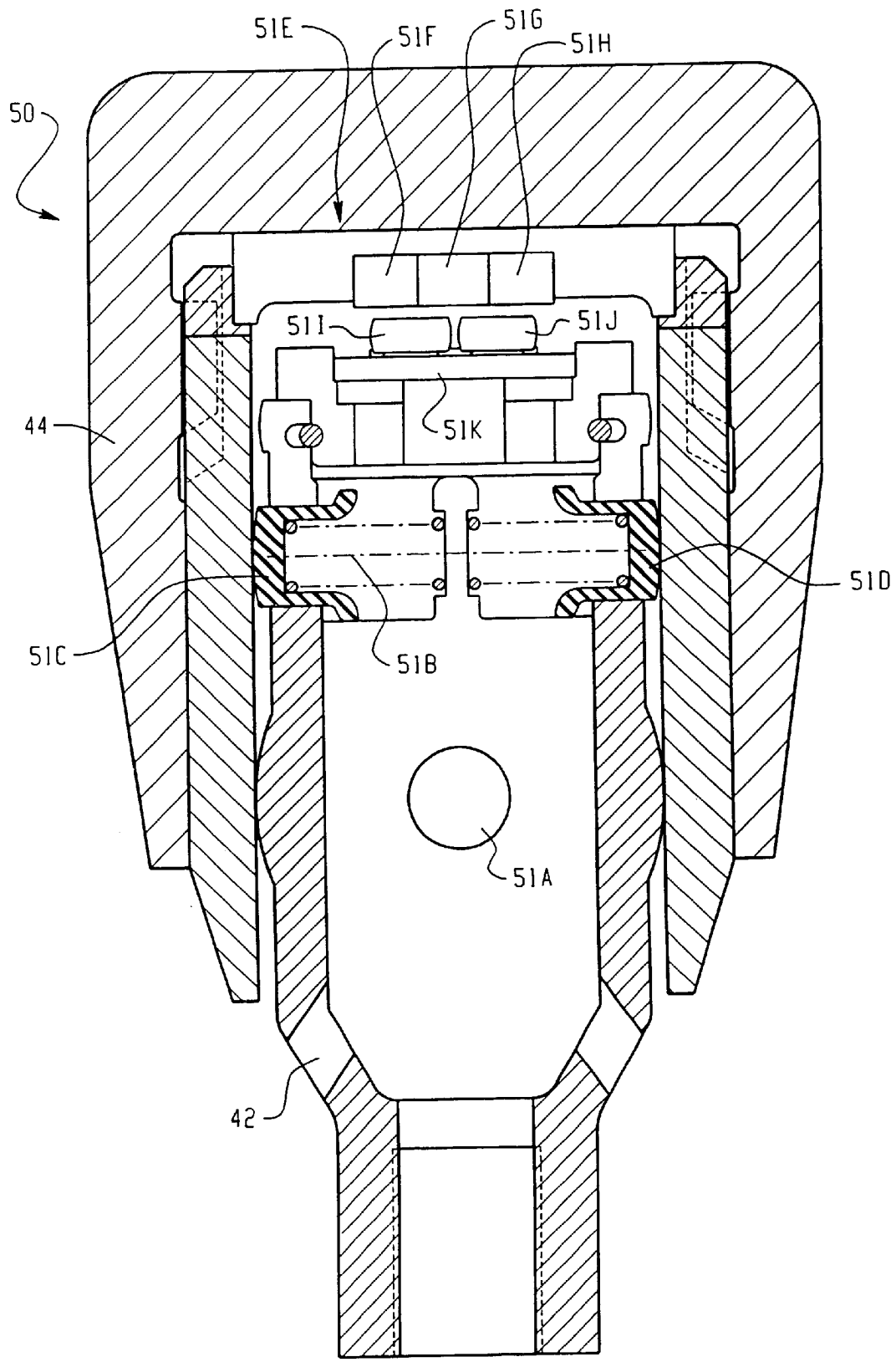
FIG. 6 illustrates the structure of the knob force sensor utilized in the transmission system of FIG. 1.

FIG. 6 illustrates another structure of an in-knob shift force sensor 50. Briefly, knob 44 is pivoted on shift lever 42 by a pin 51A. A compression spring 51B is received between spring caps 51C and 51D to resiliently center the knob on the shaft. A Hall-effect sensor assembly 51E is provided to sense movement of the knob in the fore or aft direction relative to the shaft.

The sensor assembly 51E comprises three magnets 51F, 51G and 51H, which are in close proximity to sensors 51I and 51J, mounted on a circuit board 51K.

By utilizing the fore and aft force signals in combination with the shift lever position signal, the operator's intent may be determined. By way of example, if the shift lever is in the 5th/6th shift pattern position 60, a fore force signal (FF) may be taken as an indication that the driver intends to disengage the currently engaged ratio and move to neutral, while an aft force signal (FA) will simply be ignored. When in a neutral position in the shift pattern 62 and aligned with the 3rd/4th and 5th/6th leg of the shift pattern 64, a fore force signal may be taken as a driver intent to shift to the 3rd/4th shift pattern position 66, while an aft force signal (FA) may be taken as an indication of the driver's desire to shift to the 5th/6th shift pattern position 60. Of course, in the absence of a directional force signal, a movement along shift pattern leg 64 from the neutral position 62, to a displaced position (such as 68) may be taken as an indication of an operator desire to engage the 3rd/4th shift pattern position 66.

Figure 3:
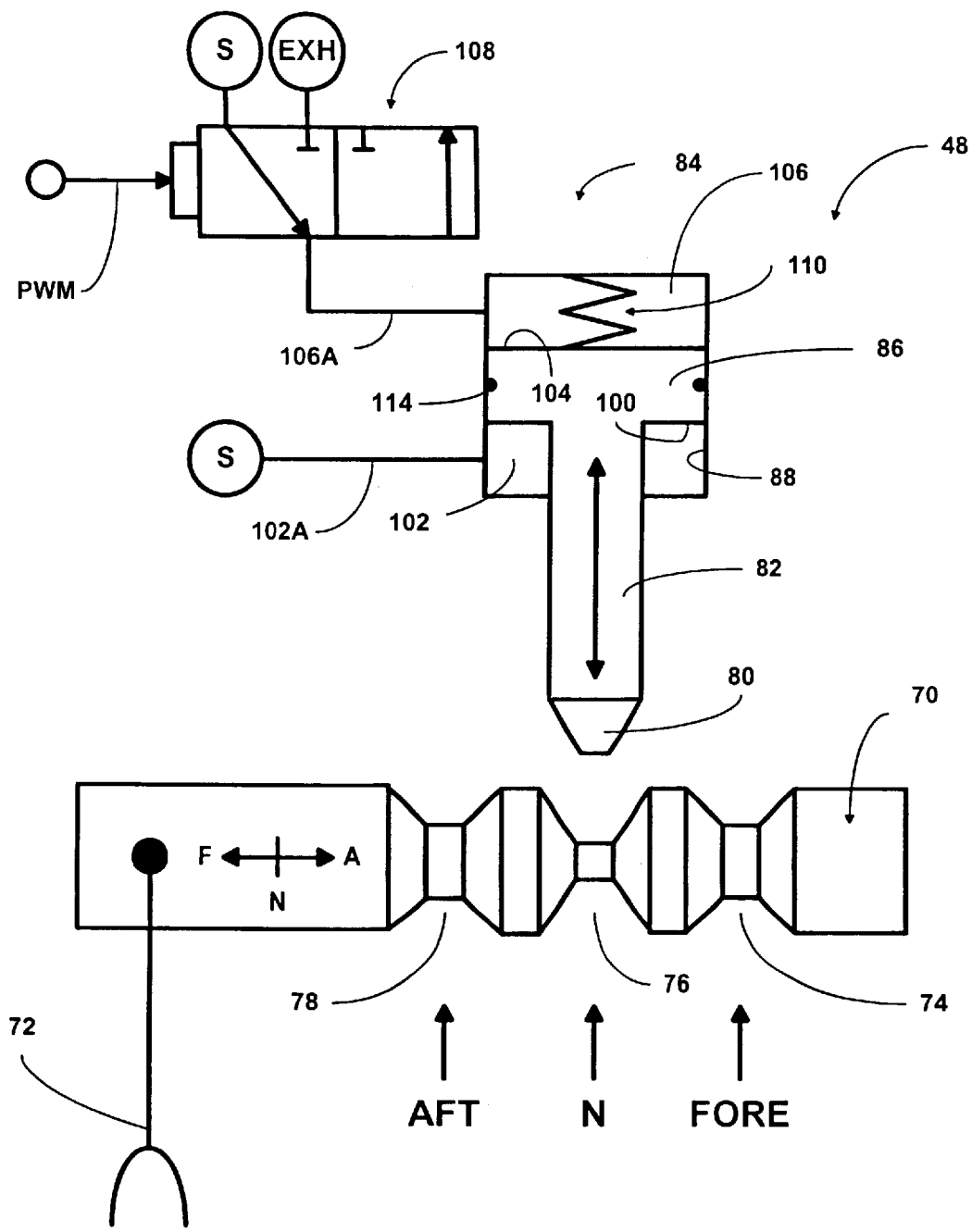
FIG. 3 is a schematic illustration of the locking/detent plunger assembly utilized with the transmission of FIG. 1.

As is well known in the prior art, shift lever 42 is movable along leg 12B in the X-X direction, also called the selection direction, and in the Y-Y direction, also called the engaging and disengaging direction, causing the selected engagement and disengagement of selected jaw clutches within the main transmission section 14 of transmission 12. The shifting mechanism will typically include one or more shift shafts or shift rails 70 carrying one or more shift forks 72, which will cooperate with a jaw clutch member for engaging and disengaging selected gear ratios. Typically, as is indicated in FIG. 3, shift shaft 70 may be moved either fore or aft from a centered or neutral position for engaging and disengaging selected gear ratios. Shift bar housing assemblies and single shift shaft assemblies are well known in the prior art, and examples thereof may be seen by reference to U.S. Pat. Nos. 4,550,627; 4,974,468; 4,873,881; 4,920,815 and 5,737,696, the disclosures of which are incorporated herein by reference.

Shaft 70 is provided with inwardly tapered and/or stepped grooves 74, 76 and 78, which will cooperate, one at a time, with an inwardly tapered tip 80 of a locking/detent plunger 82 in the extended position of the plunger 82. A plunger actuator 84, preferably in the form of a pneumatically or hydraulically actuated piston 86 slidably and sealingly received within a cylinder 88 is responsive to command output signals from the controller 52. The neutral groove 76 is preferably (but not necessarily) deeper than the in-gear grooves 74 and 78.

Briefly, with shaft 70 in its forwardmost position, plunger 82 may be extended downwardly to contact groove 74 to inhibit axial movement of the shaft 70 and shift fork 72 carried thereby. Similarly, with the shaft 70 in its centered or neutral position, plunger 82 may be downwardly extended so that tip 80 thereof will engage groove 76 defined by the shaft 70 to inhibit axial movement of the shaft from the neutral position thereof in either the fore or the aft direction. As indicated, tip 80 and the grooves 74, 76 and 78 are provided with inwardly inclined ramp, which will allow the shaft to move axially against the bias of the plunger, whereby the assembly 48 provides an inhibit rather than a prohibit locking or detent function. Of course, by increasing the downward force on piston 86 and/or by modifying the ramp angles on the tip and/or the grooves, mechanism 48 may provide a prohibiting rather than an inhibiting function.

When in a fore or aft position and with the plunger 82 extended downwardly, the mechanism 50 will provide an in-gear detenting function to resist shift lever whip-induced jumpout and other undesirable axial movements or the shaft 70. Jaw clutch jumpout and the causes thereof are discussed in further detail in U.S. Pat. No. 5,758,543, the disclosure of which is incorporated herein by reference.

Figure 5:
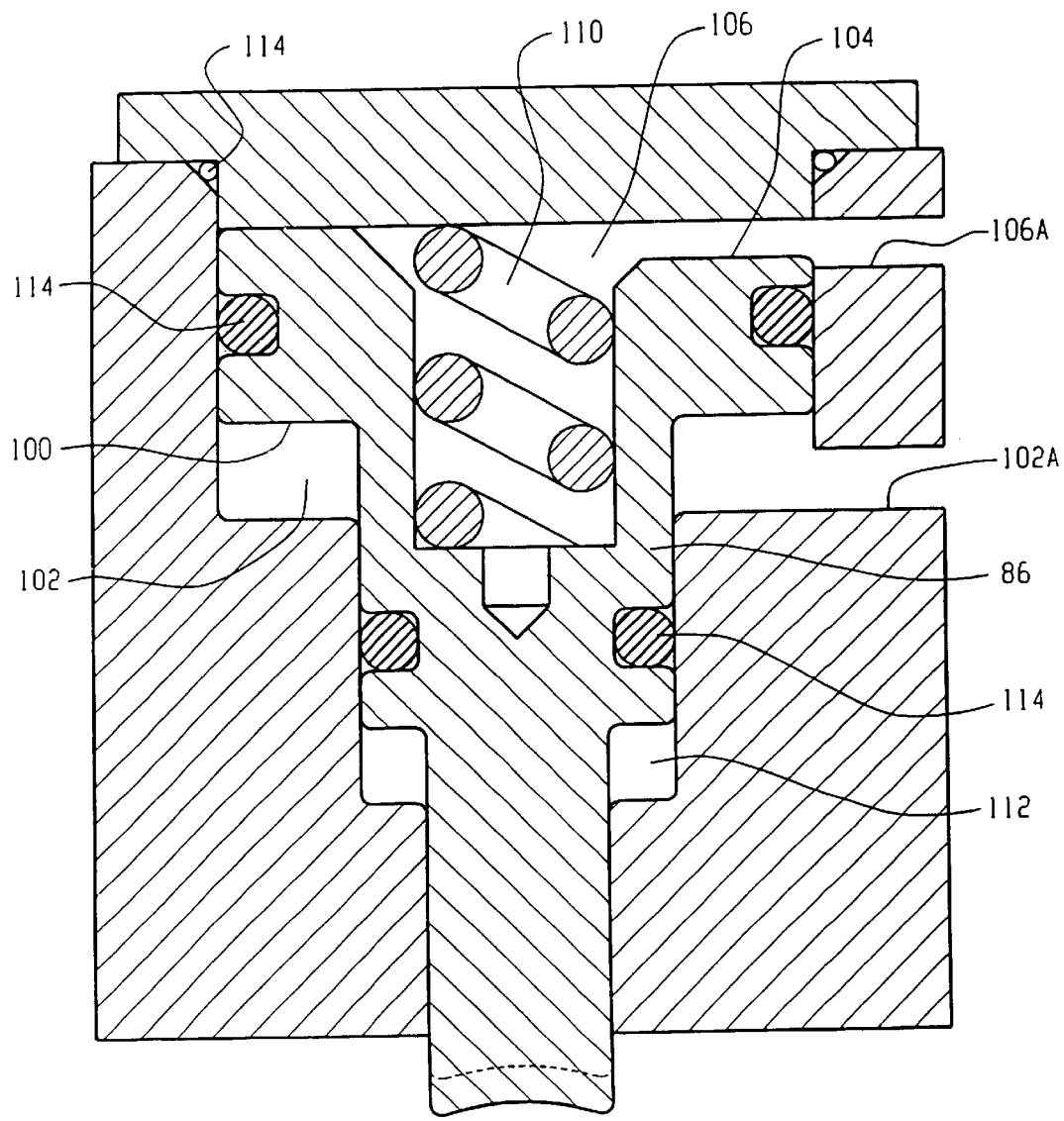
FIG. 5 illustrates the structure of the detent plunger assembly utilized in the transmission system of FIG. 1.

As may be seen by reference to FIGS. 3 and 5, piston 86 is a differential area piston having a smaller area face 100 exposed to pressurized air in chamber 102, which is constantly connected to the source S (such as a vehicle onboard air system) and a larger area face 104 exposed to selectively pressurized and exhausted chamber 106. Pressurization and exhaust of chamber 106 is controlled by a solenoid-controlled valve responding to command signals from the system controller.

A spring 110 provides a relatively small downward force on the piston, which is less than the upward force of pressurized air from chamber 102 acting on face 100.

With the vehicle engine running and the vehicle air system charged, chamber 102 will be constantly pressurized, and piston 86 will be biased upwardly to retract the plunger 82. if chamber 106 is pressurized, the downward force of air acting on larger face 104 will overpower the upward force of air acting on smaller face 100, and the piston 86 will be biased downwardly to extend the plunger 82 into contact with an aligned groove on shift shaft 70.

The spring 110 is effective, when the vehicle air system is not charged (such as at startup), to provide at least a small in-neutral detent until the air system does charge up.

Referring to FIG. 5, conduit 102A connects the chamber 102 to the vehicle air system (usually a filtered and regulated source), conduit 106A connects chamber 106 to valve 108, and cavity 112 is vented to prevent oil pumping or the like. Appropriate seals 114 are provided for the assembly.

The operation of differential area piston devices is well known in the art, as may be seen by reference to U.S. Pat. No. 5,231,895, the disclosure of which is incorporated herein by reference.

By using pulse-width modulation or an equivalent control technique, and/or by careful selection of the angles of tip 80 and the grooves 74, 76 and 78, the air pressure in chamber 106 may be selectively modulated to apply only a slight downward force on detent/locking plunger 82 to provide the operator with a "feel" of when he has properly selected neutral or an ingear position In an alternate embodiment, only a neutral groove 76 is provided to interact with the plunger 82.

In operation, system 10 will sense an operator's intent to perform a lever shift, which comprises shifting from a currently engaged ratio into neutral, and then shifting from neutral into a target ratio. A "lever shift" involves a change in main section ratio and is accomplished by moving the shift lever from one shift pattern position to a different shift pattern position. A splitter-only shift (such as 5th to 6th) does not require use of the shift lever 42 and is accomplished automatically or in response to the operation of a splitter ratio selector switch 90.

In the preferred embodiment, an intent to shift from a currently engaged ratio is sensed by sensing a force applied to the shift lever in the Y-Y direction toward neutral. For example, when in third or fourth gear (shift pattern position 66), a force in the aft direction exceeding a predetermined threshold force (about 5 to 10 pounds) is taken as an indication that the driver intends to shift from the currently engaged ratio into neutral. Upon sensing such intent, the system will respond by commanding the splitter actuator 40 to bias the splitter toward the neutral position thereof and will assume automatic control of engine fueling to cause driveline torque to assume a minimal value, thereby minimizing torque lock and allowing the engaged jaw clutches to easily separate. Preferably, as disclosed in aforementioned U.S. Pat. No. 4,850,236, the engine will be fueled to minimize engine torque and then cause first a positive and then a negative torque across the jaw clutch to be disengaged (i.e., to "dither" between positive and negative driveline torque). Upon sensing an intent to disengage the currently engaged ratio, the detent plunger 82 is caused to retract (move upwardly, as seen in FIG. 3). At this point, it will be relatively easy and will require little attention for the operator to switch from the engaged ratio to the neutral band in the Y-Y direction 62.

Upon sensing either main section or auxiliary section neutral, the controller will cease commanding the engine to dither about a zero torque value and will preferably command the engine to idle speed or toward a synchronous speed for engaging an assumed destination gear ratio. Upon sensing main section neutral, usually sensed by the X-Y position sensor 46 sensing that the shift lever is in the neutral band 62 in the Y-Y direction, the controller will command the splitter actuator to assume an automatically or manually selected splitter ratio. The splitter ratio may be selected by use of a splitter switch 90, commonly located on the shift knob, or may be automatically selected (see U.S. Pat. No. 5,435,212, the disclosure of which is incorporated herein by reference), and the locking/detent plunger 82 is forced to its extended position with tip 80 engaging walls of groove 76 to resiliently resist axial movement of the shift shaft 70. At this time, the system will determine the identity of the true target gear ratio (GRT) on the basis of the X-Y position sensor, which will indicate if the shift lever is aligned in the "R and 1st/2nd" leg or "3rd/4th and 5th/6th" leg or the "7th/8th and 9th/10th" leg of the shift pattern and the direction of force, fore or aft, applied to the shift lever. If a compound transmission, the splitter button position is also used to determine target gear ratio.

By way of example, if the shift lever is aligned with the 7th/8th and 9th/10th leg of the shift pattern, a force in the fore direction will indicate that seventh or eighth gear is the target gear, and a force in the aft direction will indicate that ninth or tenth is the target gear. Upon identifying the target gear ratio, the controller will cause the engine to assume a substantially synchronous rotation for engaging the target ratio based upon existing vehicle operating conditions. Typically, this substantially synchronous speed is the product of output shaft speed multiplied by the numerical ratio of the target gear ratio. Of course, as is well known in the prior art, an offset may be allowed or built into the calculation of the target synchronous speed. Based upon reaction times of the engine and the detent plunger assembly, as the engine speed approaches the target synchronous speed, the plunger 82 will be commanded to retract, allowing the shaft 70 to be moved axially in the appropriate direction thereof for engaging a target gear ratio.

Upon sensing engagement of the target gear ratio, the locking detent plunger will again be caused to extend into either groove 74 or 78 to resist unintended axial movement of the shift shaft 70, as may be associated with shift lever whip-induced jumpout or the like. Upon sensing engagement of the target gear ratio, control of engine fueling is returned to the operator.

Figure 4A:
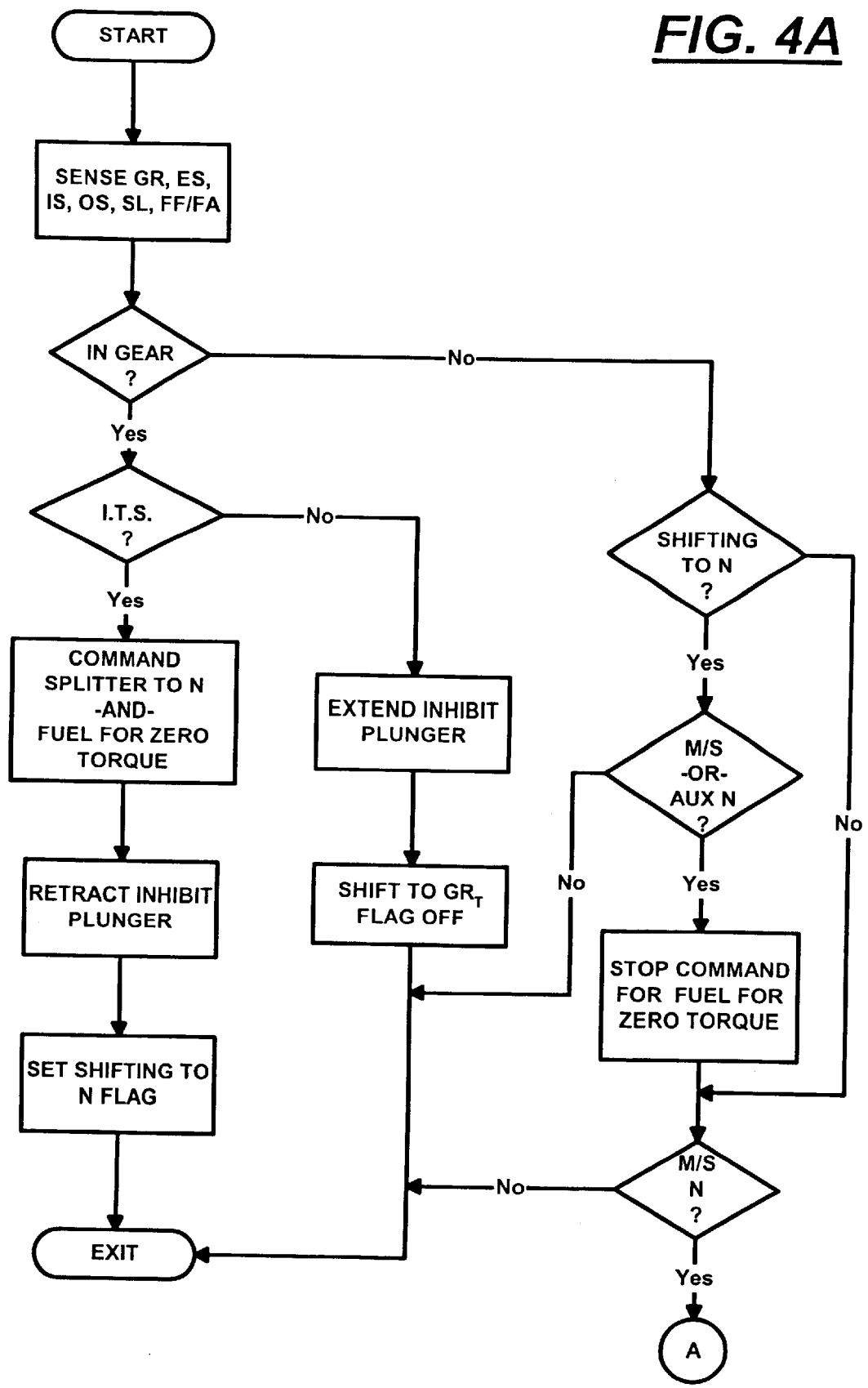
FIGS. 4A and 4B are schematic illustrations, in flow chart format, of the control method/system of the present invention.
Figure 4B:
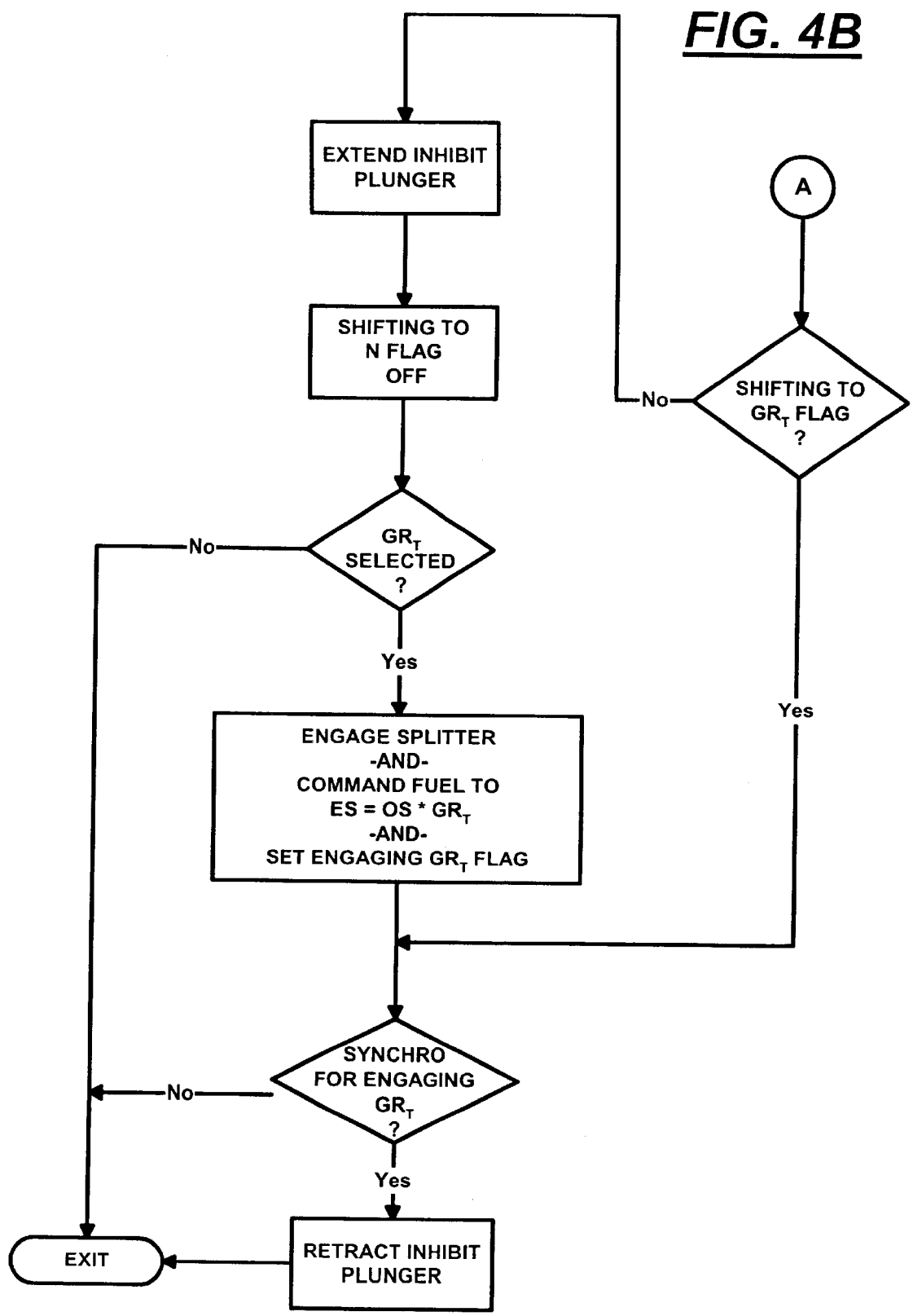

FIGS. 4A and 4B are a schematic illustration, in flow chart format, of the control method/system of the present invention.

The plunger 82 also may be used to lock the main section in neutral during shifts of the range section.

As an alternative, an intent to shift and/or target gear ratio could be determined solely on the basis of the signal SL from the shift lever position sensor if the clearance between the plunger tip 80 and the sidewalls of the grooves 74, 76 or 78 in the shaft 70 were increased, allowing a degree of backlash for the shift lever in the shift pattern sufficient to provide a detectable movement of the shift lever in the pattern sufficient to allow either an intent to shift and/or a target gear ratio to be determined.

Figure 4C:
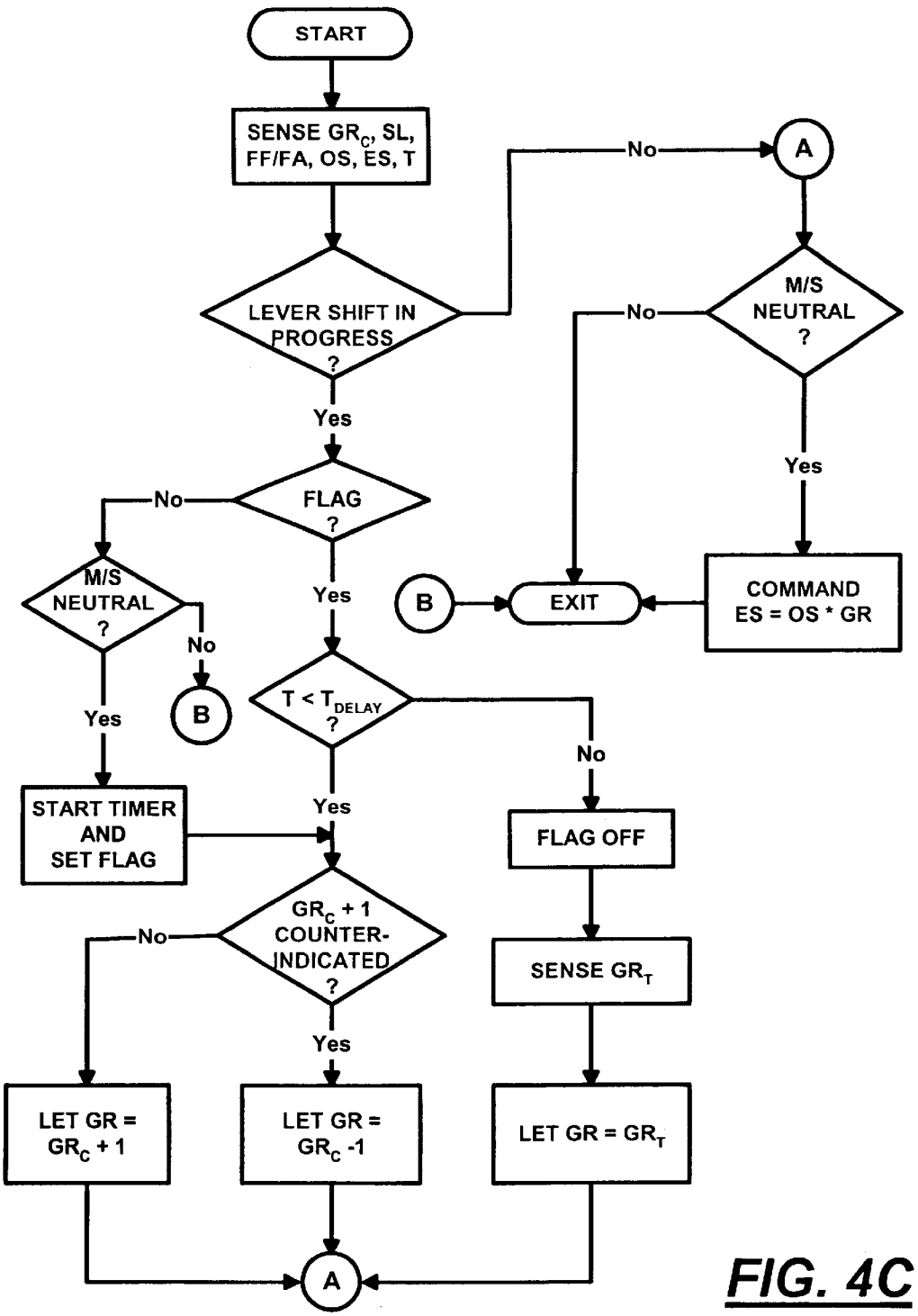
FIG. 4C is a schematic illustration in flow chart format of the preferred method of causing synchronous engine speed for engaging a target gear ratio.

To minimize false determinations of the true target gear ratio (GRT) and to minimize the time required to reach substantially synchronous engine speed/input shaft speed for engaging the true target gear ratio (with clutch 20 engaged, ESSYNCH=ISSYNCH=((OS×GRT)±offset))), the preferred embodiment utilizes the following control technique (see FIG. 4C).

Using input signals from the knob force sensors (FF/FA), the X-Y shift lever position sensor (SL) and/or from a shift-intent switch, the system will determine that a lever shift is in progress. Upon sensing that a lever shift is in progress, a neutral timer 52A is initiated and a timer flag set to initiate a delay periof of time, TDELAY. The delay period, TDELAY, is selected to allow the operator to move from the currently engaged ratio, GRC, to a meaningful shift pattern position for determining the true target ratio (GRT).

The value of TDELAY is an empirically selected value (such as 150 to 300 milliseconds, preferably about 225 milliseconds) and may be adaptively varied.

During the delay period, a destination ratio is assumed (GRASSUMED) and, after main section neutral is sensed, utilized to initially control engine speed (i.e., the engine is fueled to cause ES to move toward OS*GRASSUMED).

Unless there is a strong indication to the contrary, it is assumed that a single upshift is occurring (i.e., that GRASSUMED=GRC+1). As used herein, the "currently engaged ratio" (GRC) means the currently engaged ratio or, if the transmission is not currently engaged, the last engaged ratio.

The assumed ratio is utilized to give the engine a "head start" in reaching the target synchronous speed and, thus, to shorten shift times. An upshift is normally assumed as, in the absence of engine brakes or the like, speeding up an engine is much quicker than slowing down an engine.

Conditions that contraindicate an upshift assumption include (i) very low engine speeds (speeds at or near idle speed), (ii) shifts from the highest ratio position 64A (i.e., GRC=9th or 10th) and (iii) shift lever position to the left of current ratio position in the shift pattern. In such situations, a single downshift is assumed (GRASSUMED=GRC−1).

After the timer times out (T>TDELAY), the flag is turned off and true target ratio (GRT) is calculated from the position and force signals and utilized to control fueling of the engine. As sensed engine speed approaches the target synchronous speed (ES=((OS*GRT)±offset))), the locking/detent plunger is retracted and a synchronous shift to the target ratio GRTallowed.

It is intended that system 10 be driven with master clutch 20 engaged, except for starting and stopping the vehicle. Should the system sense that the master clutch 20 is disengaged during dynamic shifting (by a clutch position sensor (not shown) or if ES does not equal IS), the system will preferably operate as indicated above, except splitter actuator 40 will shift the splitter to neutral until the main section is sensed as engaged in the target ratio, at which time the splitter will be engaged in the appropriate splitter ratio.

Aforementioned allowed, co-pending U.S. Ser. No. 09/012,880, entitled VARIABLE RESISTANCE SHIFT RAIL DETENT ASSEMBLY AND SHIFT CONTROL METHOD EMPLOYING SAME, discloses the use of a detent member that is retracted upon sensing an intent-to-shift signal, thereby providing a significant in-gear detent resistance to axial movement of the shift rail, while not adversely affecting shift quality.

According to the present invention, after initially engaging the target gear ratio GRT, the control routine for returning control of fueling to the operator is not immediately initiated if the position indicator signals (SL) indicate only partial engagement of the main section jaw clutches associated with the target ratio.

Throttle recovery techniques whereby control of fueling is returned to operator control are known in the prior art, as may be seen by reference to U.S. Pat. Nos. 4,792,901 and 4,493,228, the disclosures of which are incorporated herein by reference.

Figure 7A:
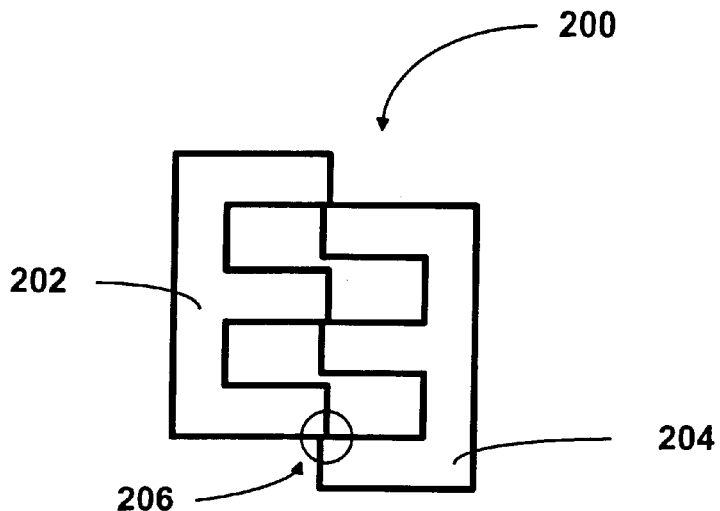
FIGS. 7A, 7B and 7C, respectively, are schematic illustrations of minimal, half and full degrees of jaw clutch engagement.
Figure 7B:
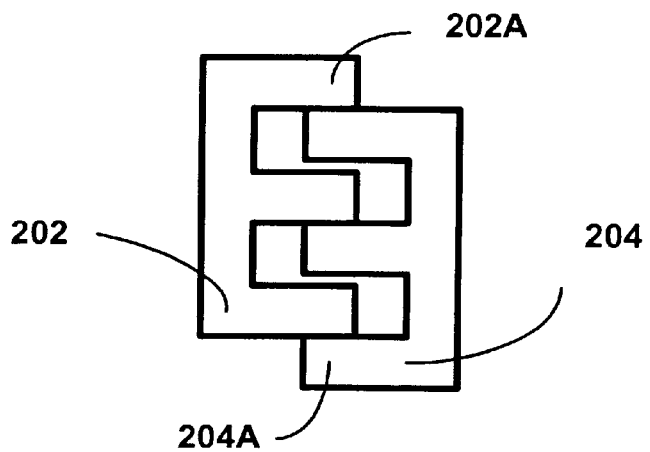
Figure 7C:
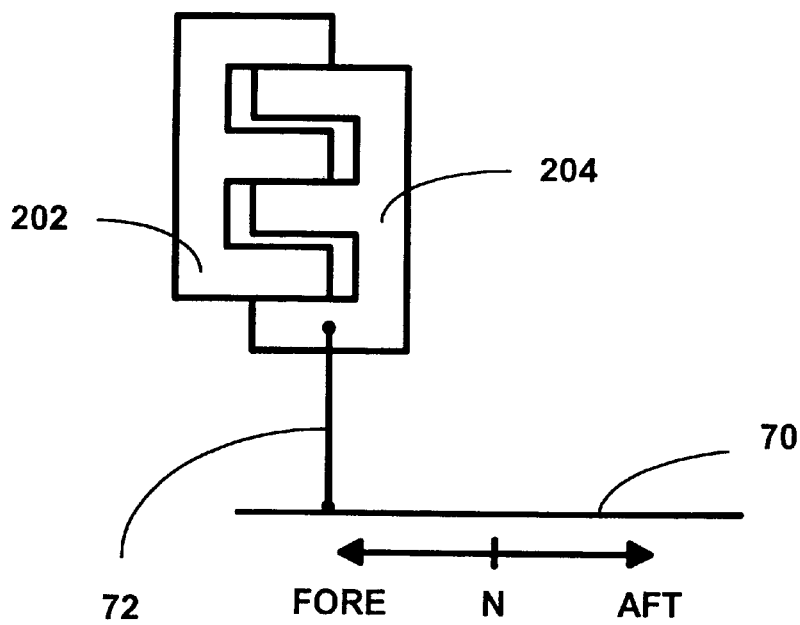

As may be seen by reference to FIGS. 7A–7C, a jaw clutch 200 includes two jaw clutch members 202 and 204 carrying interengaging teeth 202A and 204A, which may be axially separated to disengage the clutch or moved axially together to engage the clutch. In the schematic illustration, clutch member 204 is moved axially relative to member 202 by a shift fork 72 associated with a shift rail 70.

In FIG. 7A, the clutch 200 is only slightly engaged (see tip contact at 206). In this condition, full torque will cause torque lock, preventing full engagement and possible damage to the tips of the clutch teeth.

In FIG. 7B, the degree of clutch engagement is about 50%, and about 50% to 80% of the torque limit may be transmitted without causing damage to the clutch teeth.

In FIG. 7C, the clutch 60 is fully engaged. If a full recovery is initiated with less than full engagement, a torque lock condition is likely to occur, which will prevent the driver from later fully engaging the jaw clutch.

According to the present invention, if the system sensors (such as the shift lever position signals (SL)) indicate that the driver has only partially engaged the target ratio jaw clutch members, a routine is initiated wherein driveline torque is dithered between positive and zero or negative values to relieve torque lock and allow relatively easy (i.e., low force) full engagement of the engaging jaw clutch. See aforementioned U.S. Pat. Nos. 4,850,236; 5,582,558 and 5,508,916 for a discussion of "dithering." The dithering may continue until substantially full engagement is sensed or may be for a reference period of time.

If dithering is for a period of time, the period of time that dithering occurs prior to returning fuel control to the operator may be fixed (such as for about 100 to 400 milliseconds) or may be variable with the degree of engagement, the forces applied to the shift knob, or the like.

Figure 4D:
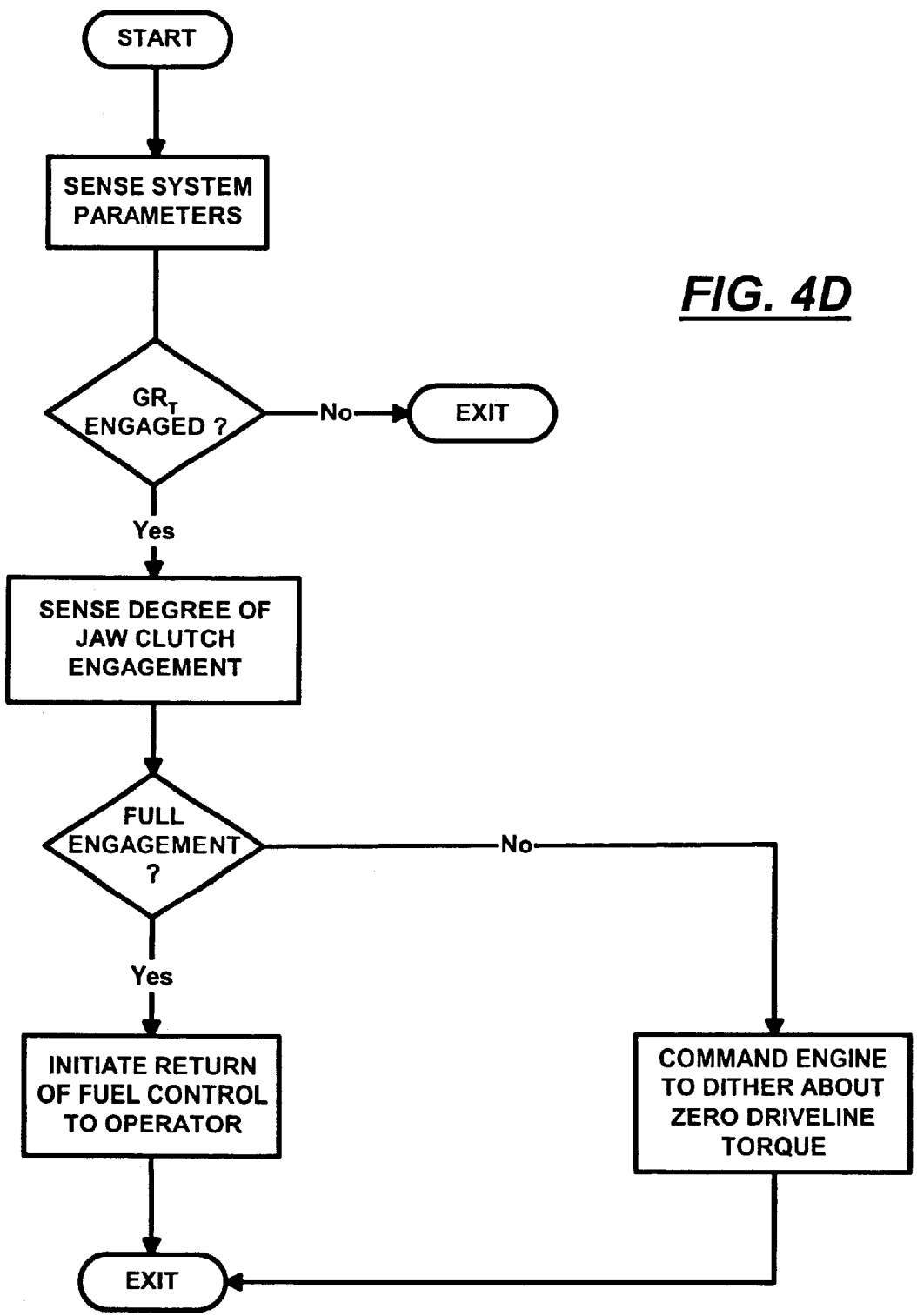
FIGS. 4D, 4E and 4F are schematic illustrations, in flow chart format, of the control method/system of the present invention for allowing full engagement of the jaw clutches associated with a target gear ratio.
Figure 4E:
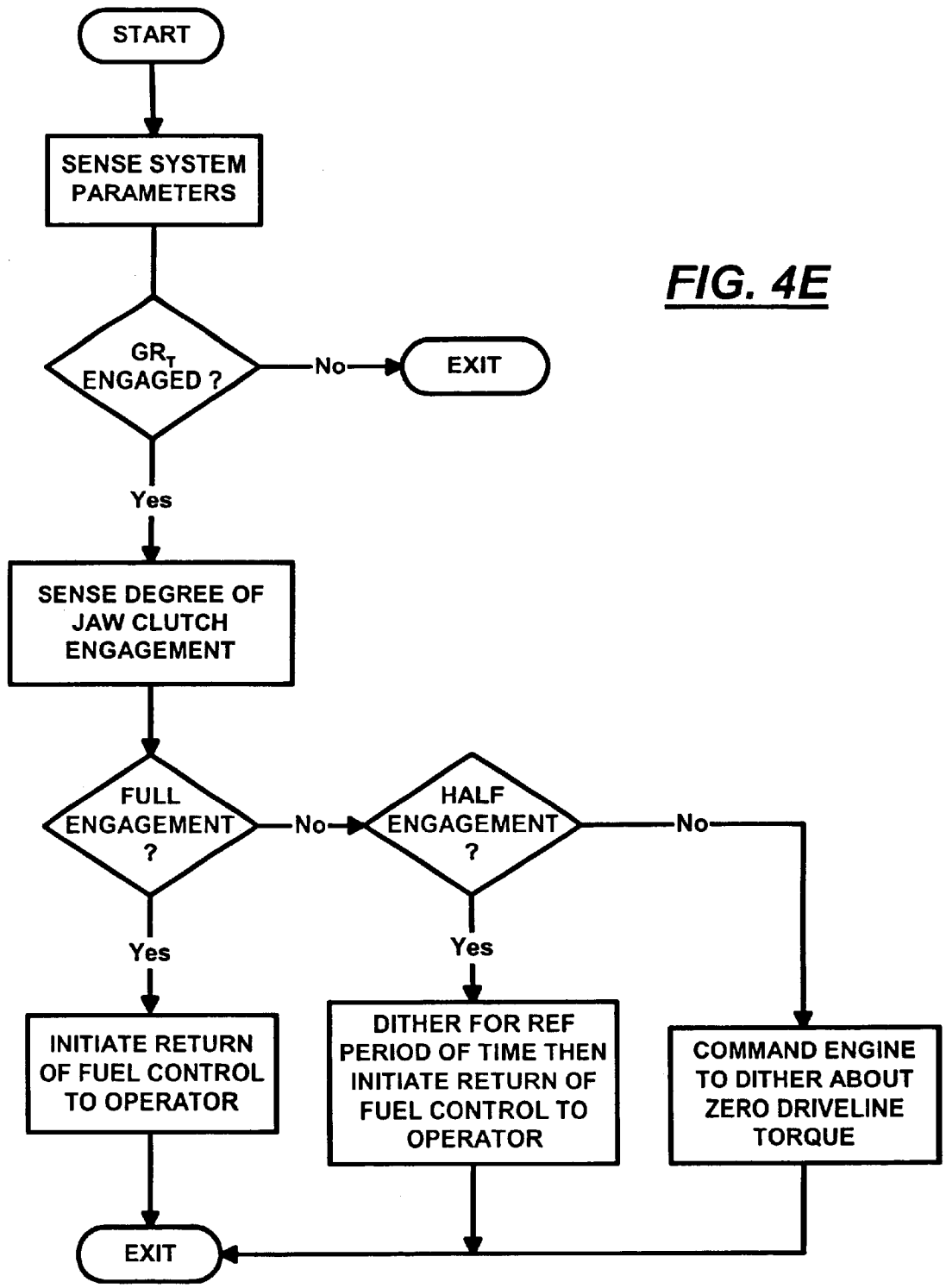
Figure 4F:
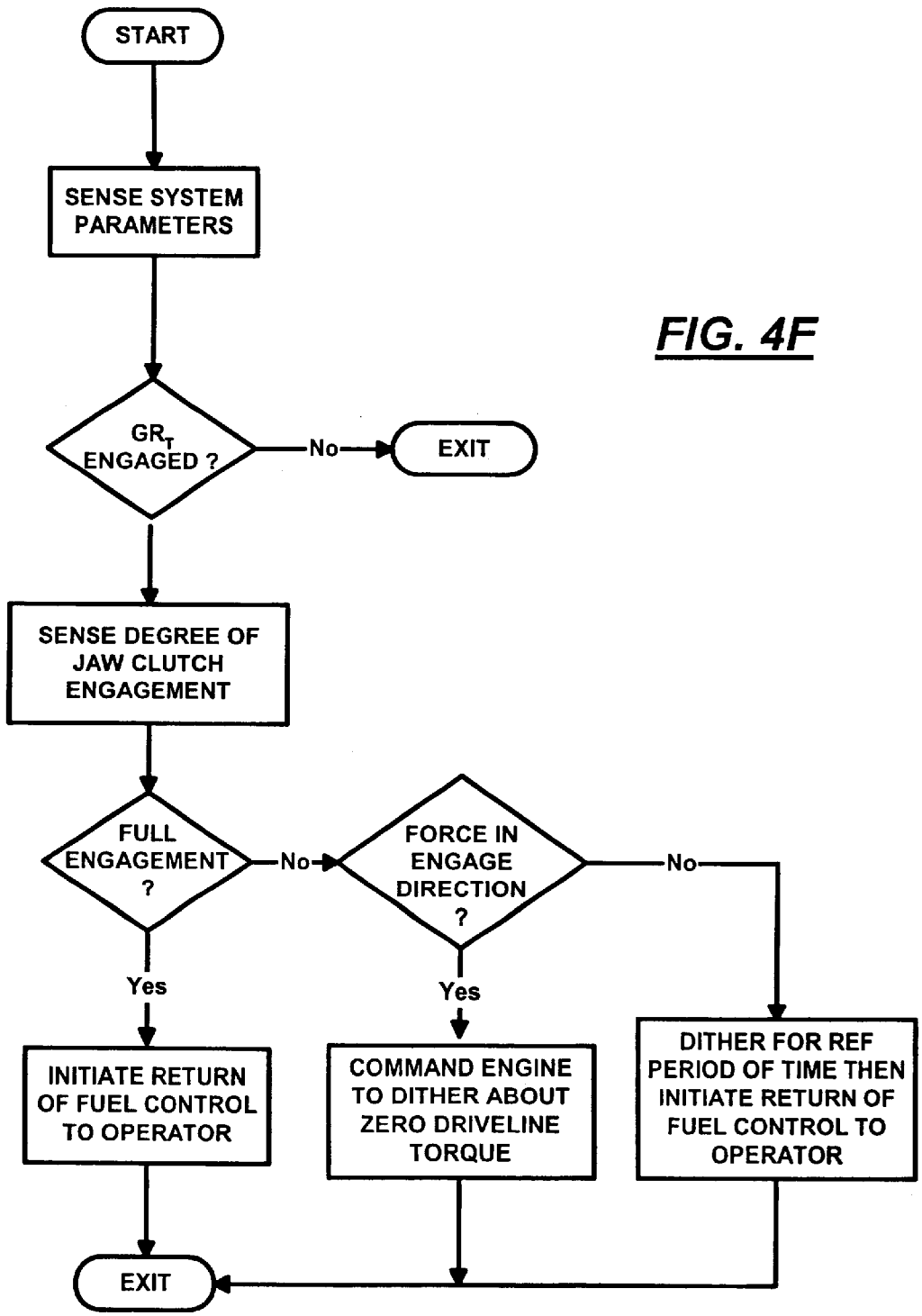

FIGS. 4D, 4E and 4F are schematic illustrations, in flow chart format, of alternate embodiments of the control system/method for allowing relatively easy, full engagement of the main section jaw clutches associated with a target gear ratio.

Accordingly, it may be seen that a new and improved control system/method for a controller-assisted, manually shifted transmission system is provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A method for controlling dynamic shifting in a manually shifted vehicular transmission system comprising a lever-shifted, non-synchronized fuel-controlled engine by a non-positive coupling, a manually operated shift lever movable in a predetermined shift pattern to move a shit member from a neutral position to at least one engaged position for engaging a selected gear ratio, said selected gear ratio engaged and disengaged by a positive jaw clutch (200) including a relatively axially movable first (202) and second (204) jaw clutch members carrying interengageable jaw clutch teeth (202A, 204A), said clutch members relatively axially movable from a disengaged position to (a) low degree of engagement position wherein said clutch teeth are in minimal engagement (FIG. 7A), and (b) a high degree of engagement position wherein said clutch teeth are at substantially full engagement (FIG. 7C), and a system controller for receiving input signals indicative of system operating conditions and processing same according to logic rules to issue command output signals to system actuators, said method comprising the steps of:

sensing a position of said shift member;

if (a) said shift member is in the neutral position, (b) there is a presence of conditions indicative of an intent to engage a selected gear ratio, and (c) substantially synchronous conditions for engaging said selected gear ratio do not exist, then automatically causing said engine to rotate at a substantially synchronous speed (ES=(OS*GRT)±offset)) for engaging said selected gear ratio;

if said selected gear ratio is engaged, sensing the degree of engagement of said jaw clutch members; and if said selected gear ratio is engaged and said jaw clutch members are not substantially fully engaged, then commanding said engine to minimize torque transfer between said input shaft and said output shaft.

2. The method of claim 1 comprising the further step:

if said selected gear ratio is engaged and said jaw clutch teeth are at substantially full engagement, then initiating return of fuel control to the vehicle operator.

3. The method of claim 1 wherein said minimizing of torque transfer is commanded for a period of time after which return of fuel control to the vehicle operator is initiated.

4. The method of claim 1 wherein said minimizing of torque transfer is commanded for a period of time after which return of fuel control to the vehicle operator is initiated.

5. The method of claim 2 wherein said minimizing of torque transfer is commanded for a period of time after which return of fuel control to the vehicle operator is initiated.

6. The method of claim 3 wherein said period of time varies with the degree of jaw clutch engagement.

7. The method of claim 4 wherein said period of time varies with the degree of jaw clutch engagement.

8. The method of claim 5 wherein said period of time varies with the degree of jaw clutch engagement.

9. The method of claim 3 wherein said system includes a sensor (50) for sensing a magnitude and direction of force applied to said shift lever and said period of time varies with the magnitude and direction of said force.

10. The method of claim 4 wherein said system includes a sensor (50) for sensing a magnitude and direction of force applied to said shift lever and said period of time varies with the magnitude and direction of said force.

11. The method of claim 5 wherein said system includes a sensor (50) for sensing a magnitude and direction of force applied to said shift lever and said period of time varies with the magnitude and direction of said force.

12. The method of claim 6 wherein said system includes a sensor (50) for sensing a magnitude and direction of force applied to said shift lever and said period of time varies with the magnitude and direction of said force.

13. The method of claim 7 wherein said system includes a sensor (50) for sensing a magnitude and direction of force applied to said shift lever and said period of time varies with the magnitude and direction of said force.

14. A system for controlling dynamic shifting in a manually shifted vehicular transmission system comprising a lever-shifted, non-synchronized transmission having an output shaft and an input shaft drivingly connected to a fuel-controlled engine by a non-positive coupling, a manually operated shift lever movable in a predetermined shift pattern to move a shift member from a neutral position to at least one engaged position for engaging a selected gear ratio, said selected gear ratio engaged and disengaged by a positive jaw clutch (200) including a relatively axially movable first (202) and second (204) jaw clutch members carrying interengageable jaw clutch teeth (202A, 204A), said clutch members relatively axially movable from a disengaged position to (a) a low degree of engagement position wherein said clutch teeth are in minimal engagement (FIG. 7A), and (b) a high degree of engagement position wherein said clutch teeth are at substantially full engagement (FIG. 7C), and a system controller for receiving input signals indicative of system operating conditions and processing same according to logic rules to issue command output signals to system actuators, said system characterized by said logic rules, including rules for:

sensing a position of said shift member;

if (a) said shift member is in the neutral position, (b) there is a presence of conditions indicative of an intent to engage said selected gear ratio, and (c) substantially synchronous conditions for engaging said selected gear ratio do not exist, then automatically causing said engine to rotate at a substantially synchronous speed ($ES=(OS*GR_T)\pm offset$) for engaging said selected gear ratio;

if said selected gear ratio is engaged, sensing the degree of engagement of said jaw clutch members; and if said selected gear ratio is engaged and said jaw clutch members are not substantially fully engaged, then commanding said engine to minimize torque transfer between said input shaft and said output shaft.

15. The system of claim 14 characterized by the further logic rule:

if said selected gear ratio is engaged and said jaw clutch teeth are at substantially full engagement, then initiating return of fuel control to the vehicle operator.

16. The system of claim 14 wherein said minimizing of torque transfer is commanded for a period of time after which return of fuel control to the vehicle operator is initiated.

17. The system of claim 15 wherein said minimizing of torque transfer is commanded for a period of time after which return of fuel control to the vehicle operator is initiated.

18. The system of claim 16 wherein said period of time varies with the degree of jaw clutch engagement.

19. The system of claim 17 wherein said period of time varies with the degree of jaw clutch engagement.

20. The system of claim 16 wherein said system includes a sensor (50) for sensing a magnitude and direction of force applied to said shift lever and said period of time varies with the magnitude and direction of said force.

21. The system of claim 17 wherein said system includes a sensor (50) for sensing a magnitude and direction of force applied to said shift lever and said period of time varies with the magnitude and direction of said force.

22. The system of claim 18 wherein said system includes a sensor (50) for sensing a magnitude and direction of force applied to said shift lever and said period of time varies with the magnitude and direction of said force.

23. The system of claim 19 wherein said system includes a sensor (50) for sensing a magnitude and direction of force applied to said shift lever and said period of time varies with the magnitude and direction of said force.

* * * * *